(12) United States Patent
Perez et al.

(10) Patent No.: US 8,720,975 B1
(45) Date of Patent: May 13, 2014

(54) INTEGRATED HOOD BUMP-STOP AND HEADLAMP ATTACHMENT FOR PEDESTRIAN PROTECTION

(71) Applicant: Ford Global Technologies, LLC, Dearborn, MI (US)

(72) Inventors: Carlos H. Perez, Ypsilanti, MI (US); Sudip S. Bhattacharjee, Novi, MI (US); James Yunhyung Lee, Novi, MI (US); Ketan K. Desai, Farmington Hills, MI (US); Marwan A. Elbkaily, Canton, MI (US); Chang Hun Lee, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/719,332

(22) Filed: Dec. 19, 2012

(51) Int. Cl.
*B60J 7/00* (2006.01)

(52) U.S. Cl.
USPC .................................... 296/187.04

(58) Field of Classification Search
USPC ............ 296/187.04, 193.11, 136.02, 187.09, 296/193.09, 193.1; 180/69.21; 362/507
See application file for complete search history.

(56) References Cited

U.S. PATENT DOCUMENTS

| | | | | |
|---|---|---|---|---|
| 5,409,288 A * | 4/1995 | Masuda | ............... | 296/193.09 |
| 5,482,348 A | 1/1996 | Mass et al. | | |
| 5,556,190 A * | 9/1996 | Saijo | ............... | 362/519 |
| 5,682,667 A * | 11/1997 | Flagg | ............... | 29/460 |
| 6,039,388 A * | 3/2000 | Choi | ............... | 296/207 |
| 6,088,878 A * | 7/2000 | Antonucci et al. | ............... | 16/86 A |
| 6,089,737 A * | 7/2000 | Ito | ............... | 362/523 |
| 6,119,306 A * | 9/2000 | Antonucci et al. | ............... | 16/86 A |
| 6,237,990 B1 * | 5/2001 | Barbier et al. | ............... | 296/187.09 |
| 6,450,276 B1 * | 9/2002 | Latcau | ............... | 180/68.4 |
| 6,471,386 B2 * | 10/2002 | Oh | ............... | 362/549 |
| 6,507,976 B2 * | 1/2003 | Ichimaru | ............... | 16/82 |
| 6,523,886 B2 * | 2/2003 | Hoffner et al. | ............... | 296/203.02 |
| 6,676,197 B2 * | 1/2004 | Ozawa | ............... | 296/187.03 |
| 6,695,396 B1 * | 2/2004 | Schwab | ............... | 296/203.02 |
| 6,840,659 B2 * | 1/2005 | Frank et al. | ............... | 362/487 |
| 6,908,127 B2 | 6/2005 | Evans | | |
| 6,926,434 B2 * | 8/2005 | Baek | ............... | 362/549 |
| 7,159,911 B2 * | 1/2007 | Nguyen et al. | ............... | 293/102 |
| 7,322,639 B2 * | 1/2008 | Takata et al. | ............... | 296/187.09 |
| 7,338,191 B2 * | 3/2008 | Konno et al. | ............... | 362/507 |
| 7,377,579 B2 * | 5/2008 | Kwon | ............... | 296/193.09 |
| 7,677,779 B2 * | 3/2010 | Schwab | ............... | 362/546 |
| 7,690,722 B2 * | 4/2010 | Boggess | ............... | 296/207 |
| 7,914,071 B2 * | 3/2011 | Saitou et al. | ............... | 296/193.09 |
| 8,191,959 B2 * | 6/2012 | Ritz | ............... | 296/187.09 |
| 2008/0018137 A1 | 1/2008 | Troton | | |
| 2011/0210579 A1 | 9/2011 | Marur et al. | | |

(Continued)

*Primary Examiner* — Kiran B Patel
(74) *Attorney, Agent, or Firm* — Jason Rogers; MacMillan, Sobanski & Todd, LLC

(57) ABSTRACT

A vehicle apparatus comprises a slider body having a substantially vertical slide slot and a substantially horizontal shear pin. The slider body further includes a headlamp mounting section and a hood bump-stop mounting section. An adjustable bumper is received by the hood bump-stop mounting section with an adjustable height. A reinforcement member is configured to be fixed with respect to a grille opening of the vehicle. The reinforcement member has a bore aligned with the slide slot for receiving a fastening pin and an aperture receiving the shear pin. A force greater than a predetermined force applied to the adjustable bumper results in the shear pin breaking off in the bore and the fastening pin sliding along the slide slot as the slider body moves downward.

11 Claims, 6 Drawing Sheets

(56) References Cited

U.S. PATENT DOCUMENTS

2012/0049547 A1* 3/2012 Nishi et al. .................. 293/132
2012/0217761 A1* 8/2012 Nakamura et al. ............. 292/97
2013/0088886 A1* 4/2013 Eckert et al. ................. 362/528

* cited by examiner

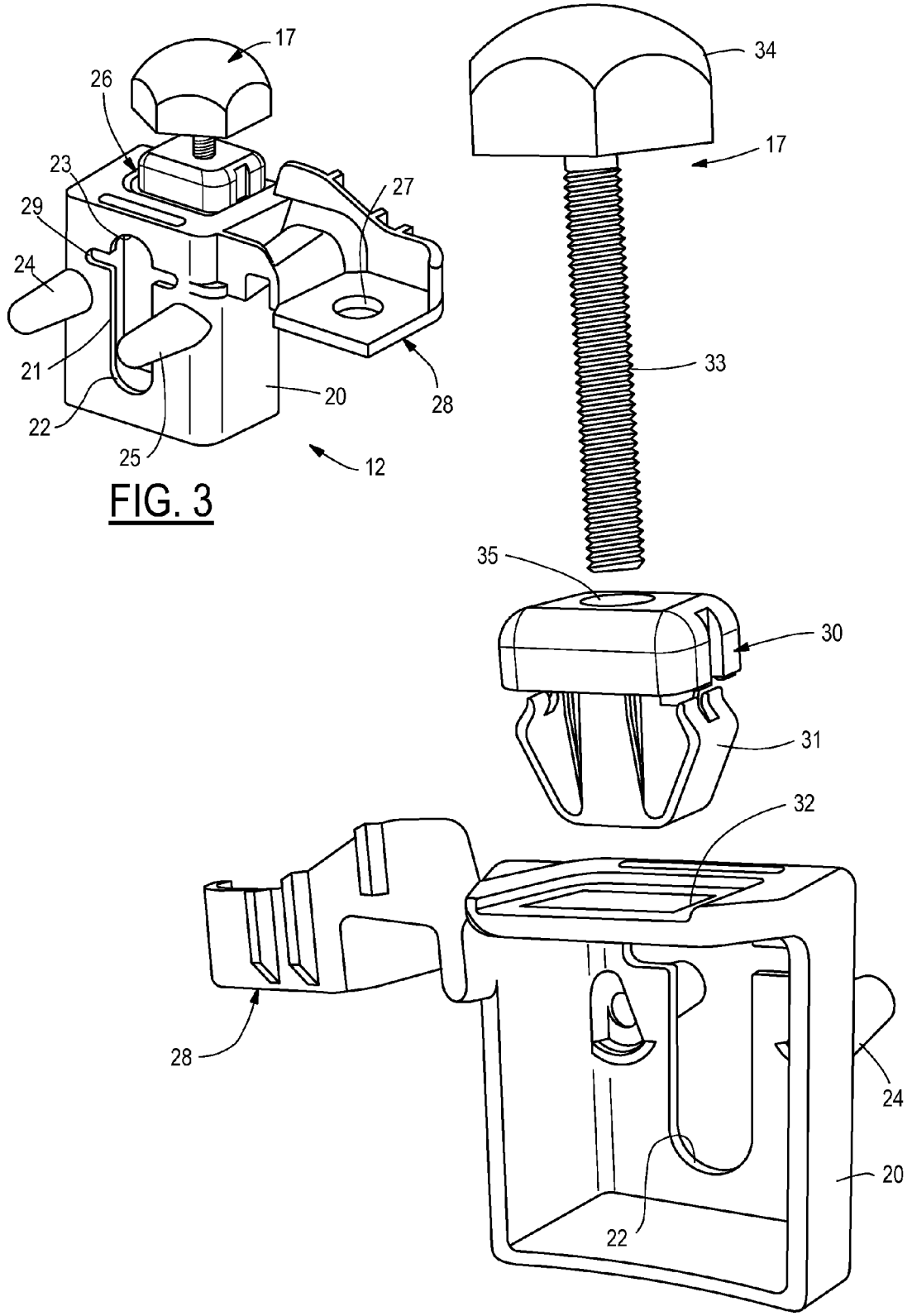

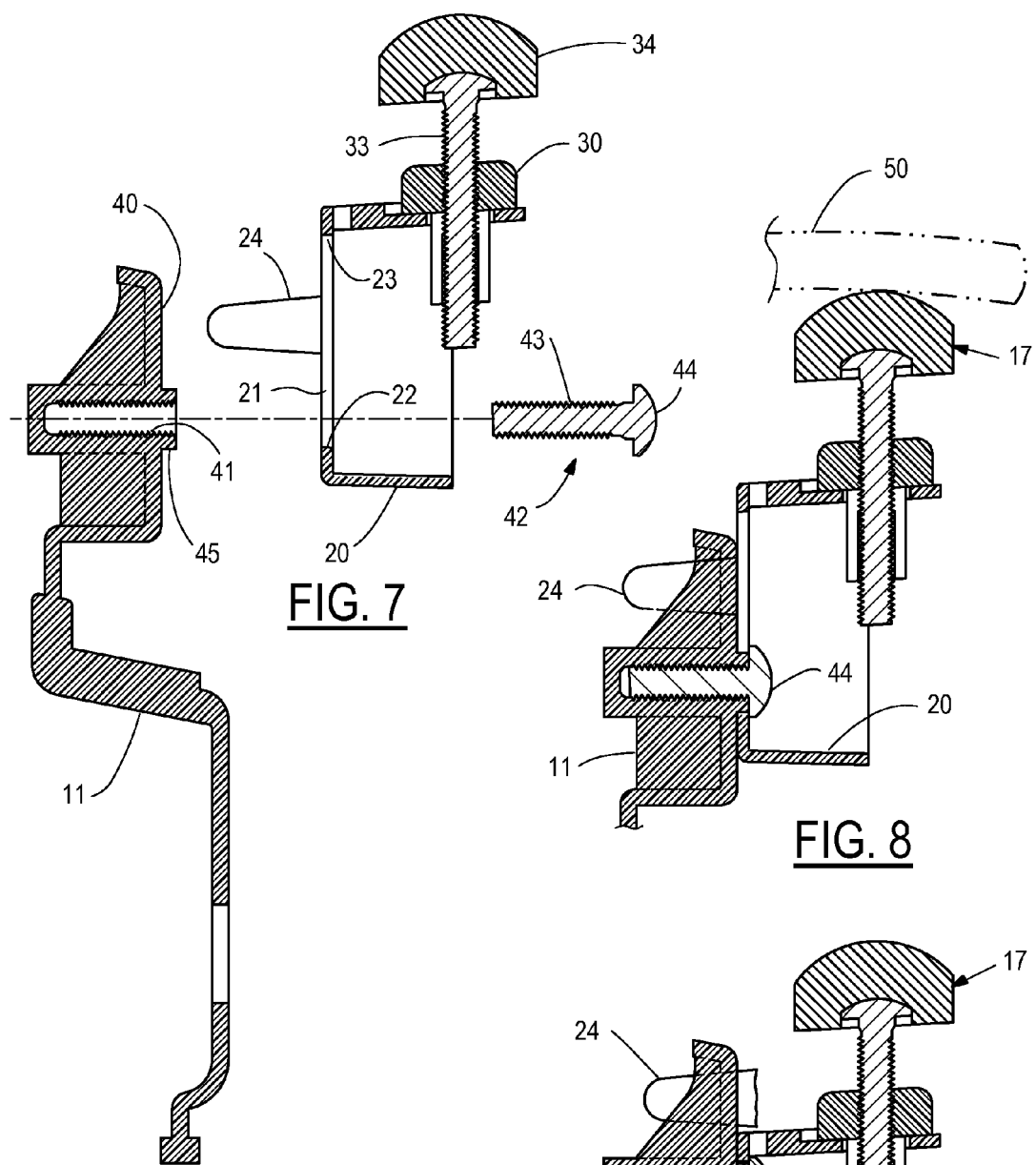

INTEGRATED HOOD BUMP-STOP AND HEADLAMP ATTACHMENT FOR PEDESTRIAN PROTECTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a support bracket for mounting a headlamp and a hood support to a grille opening reinforcement of an automotive vehicle, and, more specifically, to a breakaway support structure for managing reaction forces when the hood is impacted during a collision (e.g., with a pedestrian).

Automotive hood structures require support posts (often called bump-stops) along the sides of an engine compartment, e.g., at the front outboard corners. The bump-stops are mounted to a body reinforcement structure, such as a grille-opening reinforcement (GoR), and are typically adjustable in height in order to maintain fit and finish margins with the surrounding body closure structures. The forward areas of the hood are suspended over headlamp structures which are themselves affixed to the reinforcement structure. In the conventional mounting of hood bump-stops and headlamp modules, there has been an issue of the hood structure having a greater than desired resistance against deformation induced by a collision (most specifically by a pedestrian head impactor). In such a situation, impact speed and mass of the impactor may not be high enough to overcome the combined breakaway resistance of all the mounting components that are supporting the hood which in turn produces high acceleration.

The foregoing problem may be amplified by a particular vehicle styling in which a relatively flat hood surface is closely spaced to the headlamps. The resulting limited stroke zone together with the breakaway resistance of the headlamp and the resilience of the hood material itself may provide a hood impact strength that results in undesirably high acceleration being imparted to the impactor.

Breakaway connections have been used which limit the impact resistance at each support/mounting location. However, each support and mounting structure needs to maintain sufficient strength and robustness in order to perform its intended function during normal use over a long service lifetime. Since the hood depends on a plurality of different supporting structures, the breakaway forces for several of them may come into play during a particular impact. The summing of the resistance to breakage of the several components makes it difficult to achieve the desired response during a pedestrian impact.

SUMMARY OF THE INVENTION

The invention integrates the hood bump-stop and headlamp support bracket into a single structural element that attaches to the main underlying support structure via shear pins that will break away at a target force in order to meet the desired pedestrian head impact performance. Since the impact site on the hood may occur over a wide zone above the headlamp, the bracket may also include a horizontal slot just above the shear pins to allow the bracket to de-couple at that location if the loading is eccentric with respect to the bump-stop which might not cause the shear pins to shear off.

In one aspect of the invention, a vehicle apparatus comprises a slider body having a substantially vertical slide slot and a substantially horizontal shear pin. The slider body further includes a headlamp mounting section and a hood bump-stop mounting section. An adjustable bumper is received by the hood bump-stop mounting section with an adjustable height. A reinforcement member is configured to be fixed with respect to a grille opening of the vehicle. The reinforcement member has a bore aligned with the slide slot for receiving a fastening pin and an aperture receiving the shear pin. A force greater than a predetermined force applied to the adjustable bumper results in the shear pin breaking off in the bore and the fastening pin sliding along the slide slot as the slider body moves downward.

BRIEF DESCRIPTION OF THE DRAWINGS

FIG. 3 is a perspective view showing an integrated mounting bracket of the invention in greater detail.

FIG. 4 is an exploded perspective view of the bracket of FIG. 3 seen from the reverse side.

FIGS. 7 and 8 are side cross-sectional views of a bracket before and after installation to a reinforcement member, respectively.

FIG. 9 is a side cross section showing the bracket after being broken-away by absorbing an impact.

DETAILED DESCRIPTION OF PREFERRED EMBODIMENTS

Figure 1:
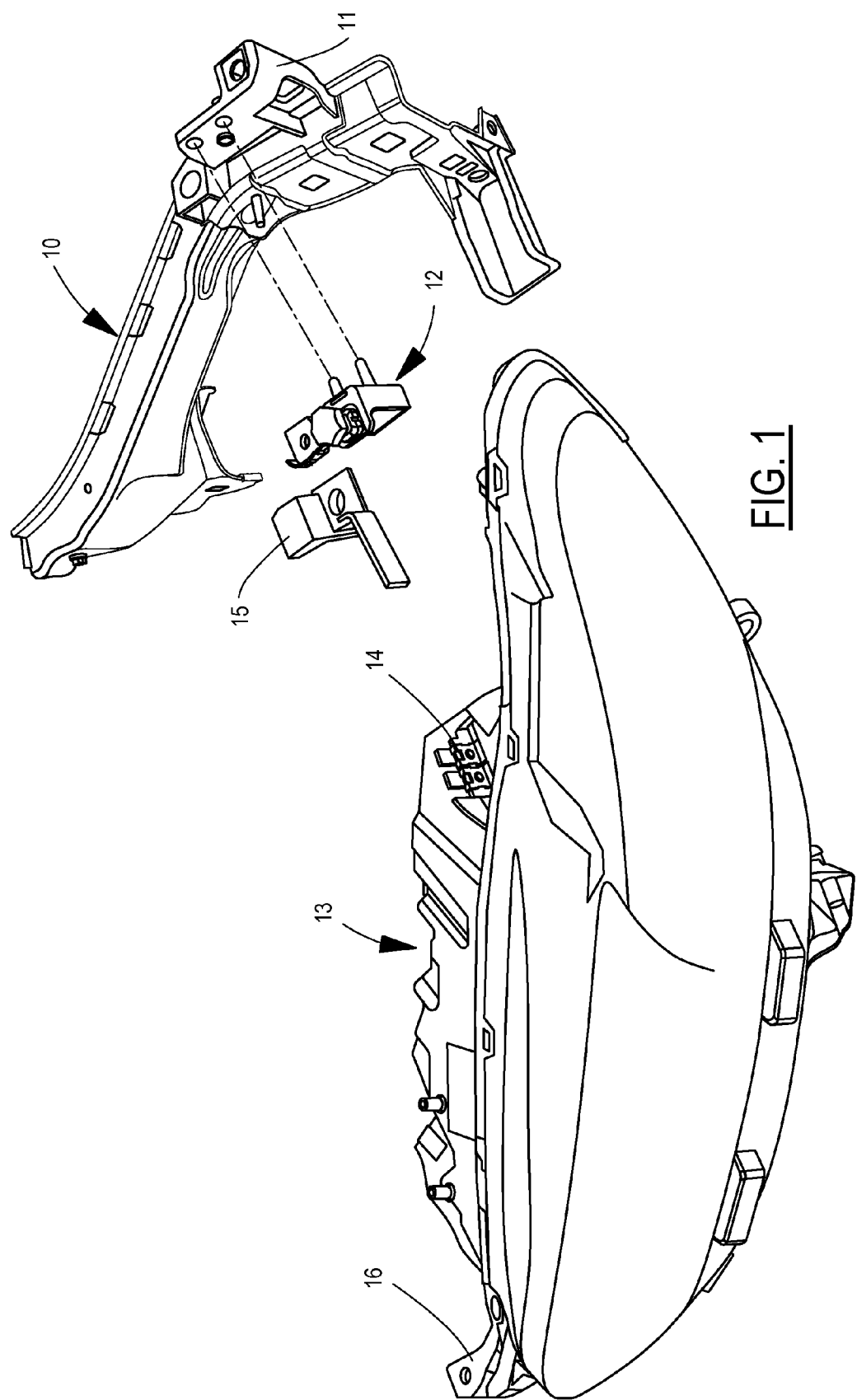
FIG. 1 is an exploded view of the integrated headlamp and hood bump-stop system according to a first embodiment of the invention.
Figure 2:
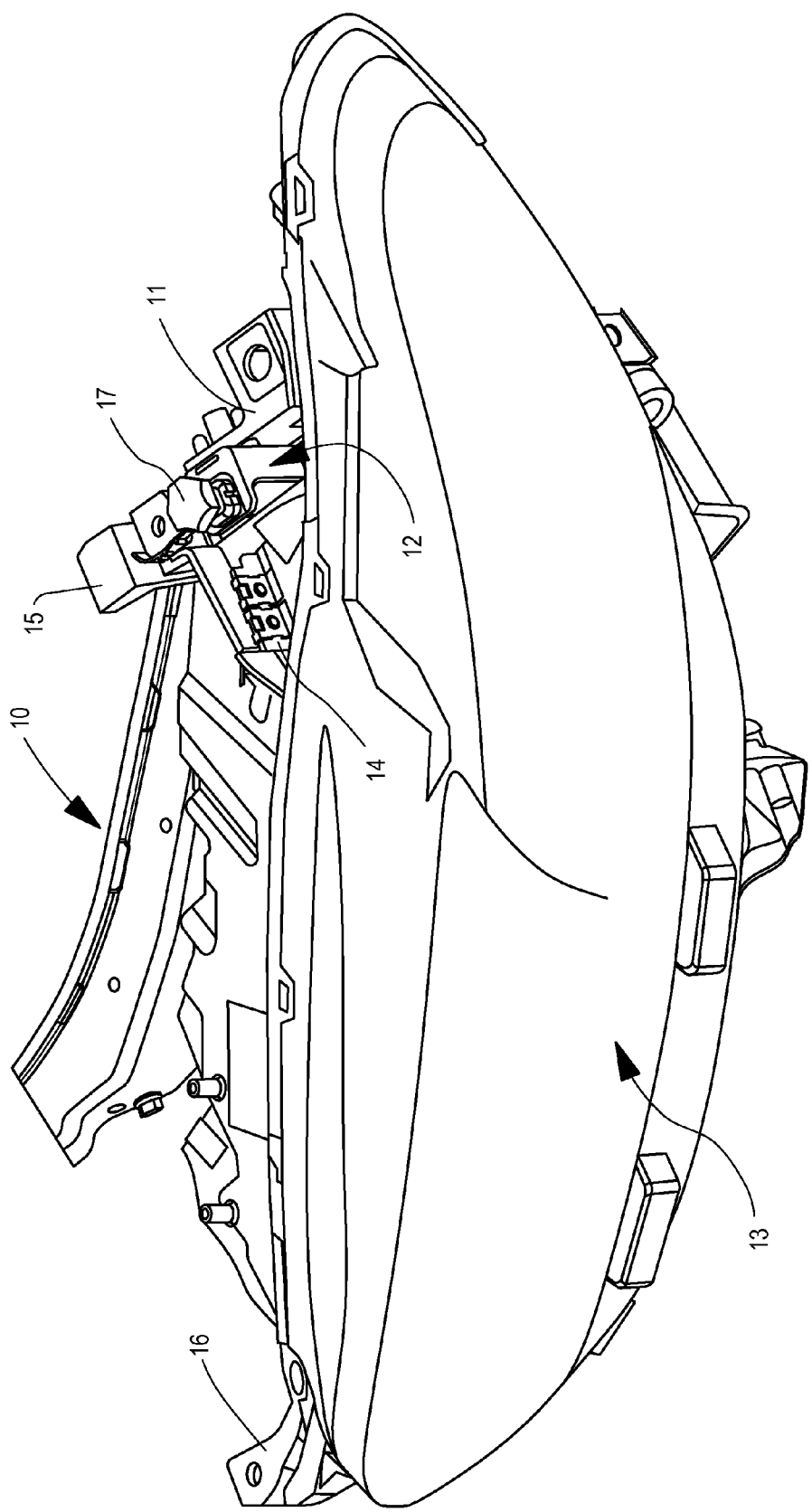
FIG. 2 is an assembled view corresponding to FIG. 1.
Figure 5:
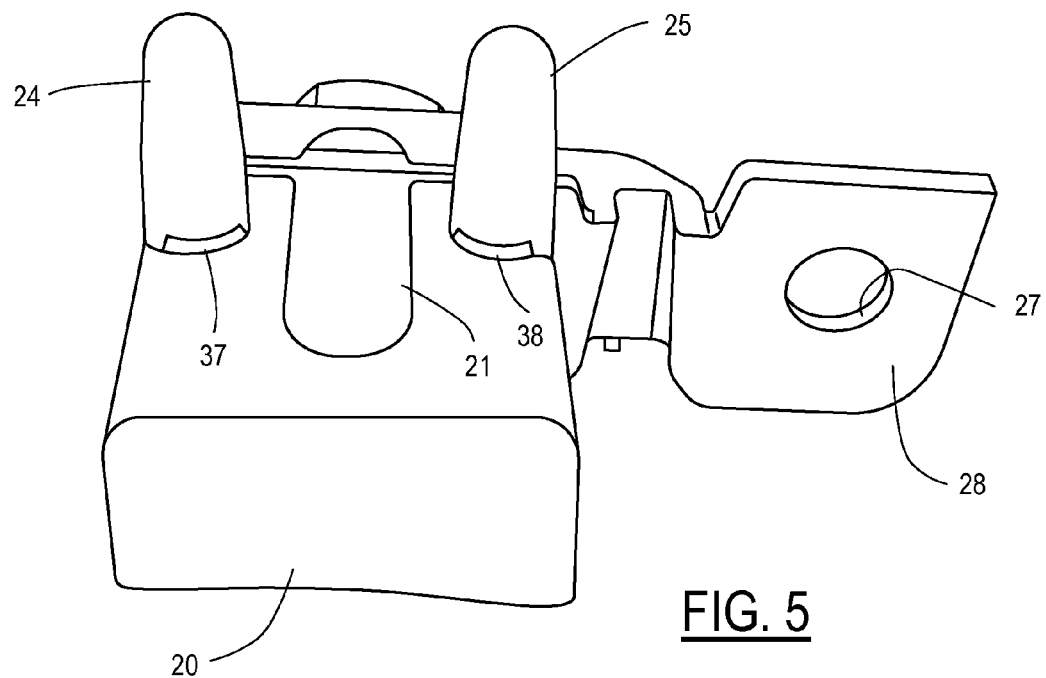
FIG. 5 is a bottom perspective view of the slider body of FIG. 3.

Referring to FIG. 1, a grill opening reinforcement (GoR) 10 is provided for mounting along an upper edge of an engine compartment at a front grill opening as is commonly used in the art. An extension 11 on reinforcement member 10 may be provided for receiving an integrated hood bump-stop and headlamp support bracket 12. A headlamp module 13 has a mounting connector 14 that is coupled to bracket 12 via an optional compensation bracket 15. Headlamp module 13 has other connection points such as a bracket 16 which can include breakaway features for severing the connection during an impact. When the attachments at 14 and 16 decouple during an impact, headlamp module 13 rotates downward around a bottom attachment (not shown). FIG. 2 shows the assembled system wherein bracket 12 is joined to extension 11, headlamp module 13, and a hood bump-stop 17.

FIG. 3 shows integrated bracket 12 together with hood bump-stop 17 in greater detail. Bracket 12 has a slider body 20 having a substantially vertical slide slot 21 and one or more substantially horizontal shear pins 24 and 25. Slide slot 21 has a bottom end 22 and an upper end 23. Slide slot 21 and sheer pins 24 and 25 are used to couple bracket 12 to the reinforcement member as described below. A hood bump-stop mounting section 26 is disposed at a top surface of bracket 12 for receiving bump-stop element 17. Bracket 12 further includes a headlamp mounting section 28 with a fastener hole 27 for coupling to the headlamp module. Above shear pins 24 and 25, a horizontal slot 29 is provided which can provide a shear plane for bracket 12 in the event that the load on the hood is eccentric with respect to the hood bump-stop (i.e., non-vertical).

In a preferred embodiment, the bump-stop mounting section 26 is comprised of a clip 30 with snap fingers 31 which are received in a mounting hole 32 on slider body 20. Clip 30 has a threaded hole 35 for receiving bump-stop element 17. Bump-stop element 17 is comprised of a threaded shaft 33 affixed to an elastomeric upper block 34 that contacts the hood. By rotating shaft 33 within hole 35, the height of upper block 34 is adjustable so that a desired height of the hood (not shown) as supported by bump-stop element 17 can be appropriately set. Preferably, shear pins 24 and 25 are formed as hollow pillar extensions extending finger-like from slider body 20. Shear pins 24 and 25 have a size and shape intended to obtain a desired magnitude for the shear force required to cause shear pins 24 and 25 to break away from slider body 20. Preferably, slider body 20 and shear pins 24 and 25 are integrally molded from a thermoplastic such as polypropylene. To achieve the desired breaking force, undercut slots 37 and 38 may be formed at the bases of shear pins 24 and 25 with a slot length that is calibrated according to the desired breaking performance.

Figure 6:
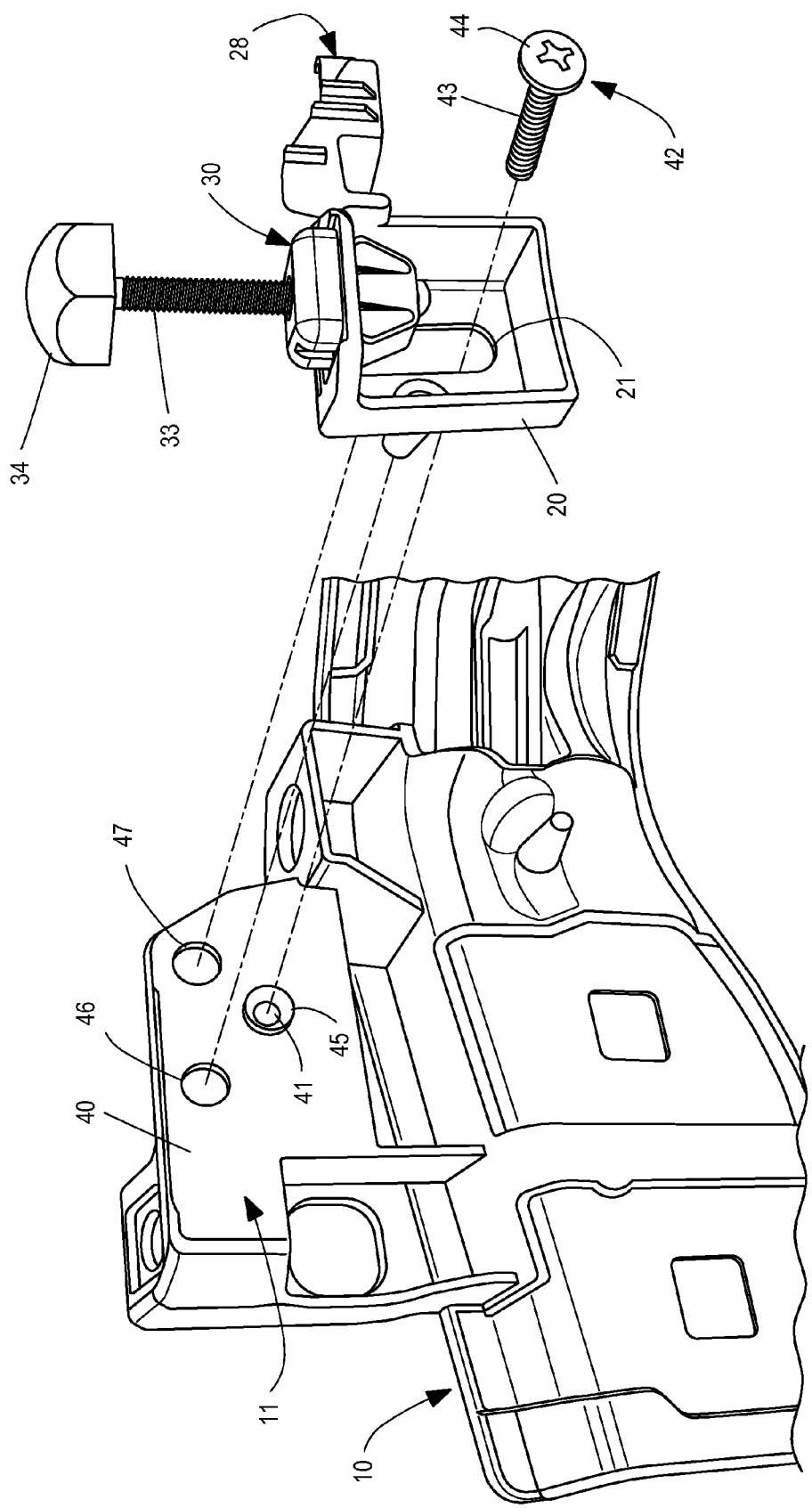
FIG. 6 is a perspective view showing the manner in which the mounting bracket attaches to the reinforcement member.

FIG. 6 shows extension 11 on reinforcement member 10 in greater detail. A vertical wall 40 has a bore 41 to be aligned with slide slot 21 of slider body 20. Wall 40 also includes a pair of apertures 46 and 47 for receiving shear pins 25 and 24, respectively. Bore 41 receives a fastening pin in the form of a bolt or screw 42 having a threaded shaft 43 and a head 44. Bore 41 preferably has a raised collar 45 defining a proximal end of bore 41. Collar 45 fits within slide slot 21. Bolt 42 is secured in threaded bore 41 so that head 44 is disposed against collar 45 thereby retaining slider body 20 against reinforcement extension 11. A washer (not shown) can be used on bolt 42 and around collar 45 in order to load collar 45. The length of collar 45 can be chosen to obtain a desired magnitude of friction between the bracket and wall 40.

FIG. 7 is a side cross section taken through a vertical center of bracket 12 and extension 11 with the various components lined up for assembly. During assembly, shear pin 24 enters aperture 47 (not shown) and collar 45 enters slide slot 21 at its bottom end 22. Bolt 42 is threaded into bore 41 as shown in FIG. 8 so that head 44 captures slider body 20 against wall 40 of extension 11. With bracket 12 in this initial position (i.e., collar 45 is at bottom end 22 of slot 21 and unbroken shear pins 24 and 25 are in their respective apertures 46 and 47), bump-stop 17 is disposed at an adjustable height in order to support a hood 50 in the desired location and the headlamp module is rigidly mounted to the GoR.

During an impact against hood 50, forces may be transmitted through either bump-stop 17 or through the headlamp mounting section into slider body 20. If a force greater than a predetermined force is applied to the slider body, the shear pins 24 and 25 break off in their respective apertures. Then fastening pin 42 slides along slide slot 21 while slider body 20 moves downward as shown in FIG. 9. A sufficient force will deflect slider body 20 such that fastening pin or bolt 42 slides all the way to the upper end of slide slot 21.

Figure 10:
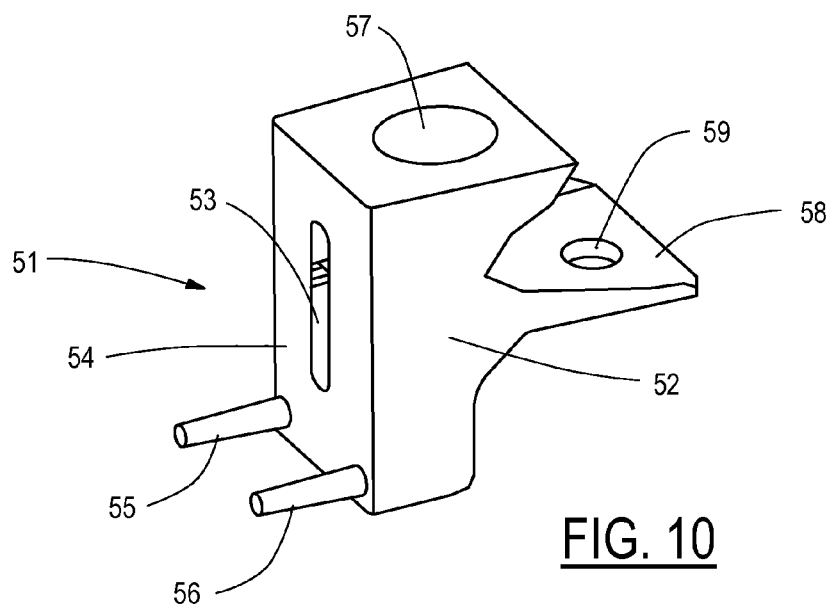
FIG. 10 is a perspective view of another embodiment of the slider body.

FIG. 10 shows an alternative embodiment of a mounting bracket 51 of the present invention. A slider body 52 has a slide slot 53 on one side wall from which pair of shear pins 55 and 56 extend in a horizontal direction. A receiving hole 57 at a top surface of slider body 52 is adapted to receive a bump-stop. A wing 58 extends from a side of slider body 52 and has a receiving hole 59 for connecting to a headlamp module or a compensation bracket (not shown) for example. Slider body 52 mounts to a fixed reinforcement structure in the same way as in the previous embodiment. Since movement of sliding body 52 responds to the combined forces applied via the hood bump-stop mount and/or the headlamp module mount, a more consistent and well controlled response is obtained during a relatively lower impact force as would occur in a collision with a pedestrian, so that serious injuries are less likely to occur.

What is claimed is:

1. Vehicle apparatus comprising:
    a slider body having a substantially vertical slide slot and a substantially horizontal shear pin, wherein the slider body further includes a headlamp mounting section and a hood bump-stop mounting section;
    a bump-stop received by the hood bump-stop mounting section extending vertically to receive a hood; and
    a reinforcement member configured to be fixed with respect to a grille opening of a vehicle and having a bore aligned with the slide slot for receiving a fastening pin and an aperture receiving the shear pin;
    wherein a force greater than a predetermined force applied to the slider body via the headlamp mounting section and a hood bump-stop mounting section results in the shear pin breaking off in the aperture and the fastening pin sliding along the slide slot as the slider body moves downward to allow downward movement of the hood.

2. The apparatus of claim 1 wherein the bore and fastening pin are disposed at a bottom end of the slide slot before breaking off of the shear pin and are disposed at a upper end of the slide slot after breaking off of the shear pin.

3. The apparatus of claim 1 wherein the slider body further includes a horizontal slot above the shear pin for providing a non-vertical shear plane.

4. The apparatus of claim 1 wherein the slider body has a raised collar defining an end of the bore, wherein the collar is disposed within the slide slot, and wherein the fastening pin includes a head disposed against the collar for retaining the slider body against the reinforcement member.

5. The apparatus of claim 4 wherein the bore is threaded, and wherein the fastening pin is comprised of a threaded bolt.

6. The apparatus of claim 1 wherein the hood bump-stop mounting section includes a threaded hole, wherein the bump-stop has an adjustable height, and wherein the bump-stop is comprised of a threaded shaft and an elastomeric upper block.

7. The apparatus of claim 1 wherein the slider body includes two shear pins and the reinforcement member includes two corresponding apertures for receiving the shear pins.

8. The apparatus of claim 1 wherein the slider body is comprised of a molded thermoplastic, and wherein the shear pin is comprised of a hollow pillar extension.

9. The apparatus of claim 8 wherein the hollow pillar extension includes an undercut along a predetermined portion of a base of the pillar extension for setting the predetermined force.

10. The apparatus of claim 1 further comprising a compensation bracket having a first end joined to the headlamp mounting section and a second end configured to attach to a headlamp module.

11. Vehicle apparatus comprising:
    a slider having a slide slot, a shear pin, a headlamp mount, and a bump-stop for supporting a hood;

a reinforcement member fixed on the vehicle having a bore aligned with the slide slot and an aperture receiving the shear pin; and a fastener extending through the slide slot into the bore;

wherein a predetermined force causing the shear pin to break results in the fastener sliding in the slide slot.

* * * * *